(12) United States Patent
Widmer et al.

(10) Patent No.: US 11,336,137 B2
(45) Date of Patent: May 17, 2022

(54) ROTOR ASSEMBLY

(71) Applicant: UNIVERSITY OF NEWCASTLE UPON TYNE, Tyne and Wear (GB)

(72) Inventors: James Dumesnil Widmer, Tyne and Wear (GB); Mohammad Kimiabeigi, Tyne and Wear (GB)

(73) Assignee: Advanced Electric Machines Group Limited, Washington (GB)

( * ) Notice: Subject to any disclaimer, the term of this patent is extended or adjusted under 35 U.S.C. 154(b) by 836 days.

(21) Appl. No.: 16/069,726

(22) PCT Filed: Jan. 10, 2017

(86) PCT No.: PCT/GB2017/050044
§ 371 (c)(1),
(2) Date: Jul. 12, 2018

(87) PCT Pub. No.: WO2017/121994
PCT Pub. Date: Jul. 20, 2017

(65) Prior Publication Data
US 2019/0027985 A1 Jan. 24, 2019

(30) Foreign Application Priority Data
Jan. 14, 2016 (GB) ...................................... 1600730

(51) Int. Cl.
*H02K 1/28* (2006.01)
*H02K 1/276* (2022.01)
*H02K 1/2753* (2022.01)

(52) U.S. Cl.
CPC ............. *H02K 1/28* (2013.01); *H02K 1/2753* (2013.01); *H02K 1/2773* (2013.01); *H02K 2201/15* (2013.01)

(58) Field of Classification Search
CPC ...... H02K 1/28; H02K 1/2753; H02K 1/2773; H02K 2201/15
See application file for complete search history.

(56) References Cited

U.S. PATENT DOCUMENTS

| 1,689,499 | A | | 10/1928 | Reist |
| 4,179,634 | A | | 12/1979 | Burson |
| 4,336,649 | A | | 6/1982 | Glaser |
| 4,942,324 | A | | 7/1990 | Ooyama et al. |
| 5,091,668 | A | * | 2/1992 | Cuenot ............... H02K 1/2773 310/156.61 |

(Continued)

FOREIGN PATENT DOCUMENTS

| CN | 104184230 A | 12/2014 |
| CN | 104393730 A | 3/2015 |

(Continued)

OTHER PUBLICATIONS

International Search Report, dated Mar. 28, 2017 (PCT/GB2017/050044).

*Primary Examiner* — Jue Zhang
(74) *Attorney, Agent, or Firm* — Robert L. Stearns; Dickinson Wright, PLLC

(57) ABSTRACT

A rotor assembly (10) has a rotor support hub (12) which includes a plurality of first connection parts arranged about a periphery the rotor support hub. The rotor assembly further has a plurality of rotor segments (14) each having a second connection part. Each of the second connection parts are cooperable with at least one of the plurality of first connection parts to connect each of the rotor segments about the periphery the rotor support hub. A plurality of fixing parts (26) are each configured to be received between cooperating first and second connection parts and to form an inference fit therebetween so as to secure the rotor segments to the rotor support hub. The rotor support hub may comprise a plurality of laminations.

20 Claims, 4 Drawing Sheets

(56) References Cited

U.S. PATENT DOCUMENTS

| | | |
|---|---|---|
| 6,734,596 B1 | 5/2004 | Liao |
| 7,811,062 B1 * | 10/2010 | Twigg .................. F04D 29/321 |
| | | 416/218 |
| 2006/0232160 A1 | 10/2006 | Kanno et al. |
| 2006/0233160 A1 | 10/2006 | Kawanishi et al. |
| 2008/0024018 A1 | 1/2008 | Rignault et al. |
| 2010/0277028 A1 | 11/2010 | Alexander et al. |
| 2012/0074801 A1 | 3/2012 | Brown et al. |
| 2013/0119816 A1 | 5/2013 | Yang et al. |
| 2015/0035402 A1 * | 2/2015 | Reddy .................... H02K 15/03 |
| | | 310/156.01 |
| 2015/0097463 A1 * | 4/2015 | Blocher ............. B32B 37/1284 |
| | | 310/216.065 |
| 2015/0192144 A1 * | 7/2015 | Murdock ................ F01D 5/323 |
| | | 416/220 R |

FOREIGN PATENT DOCUMENTS

| | | | |
|---|---|---|---|
| EP | 1879278 | A1 | 1/2008 |
| EP | 2246962 | A2 | 11/2010 |
| EP | 2840692 | A2 | 2/2015 |
| GB | 285458 | A | 7/1928 |
| GB | 363756 | A | 12/1931 |
| GB | 2022324 | A | 12/1979 |
| JP | S53119506 | U | 9/1978 |
| JP | S566636 | A | 1/1981 |
| JP | S6098836 | A | 6/1985 |
| JP | S60128839 | A | 7/1985 |
| JP | H04340340 | A | 11/1992 |
| JP | H11098732 | A | 4/1999 |
| JP | 2002281709 | A | 9/2002 |
| JP | 2010259250 | A | 11/2010 |
| JP | 2011250576 | A | 12/2011 |
| JP | 2013198304 | A | 9/2013 |
| JP | 2013539348 | A | 10/2013 |
| JP | 2013229955 | A | 11/2013 |
| JP | 2013229955 | A * | 11/2013 |
| JP | 2015033329 | A | 2/2015 |
| JP | 2015115986 | A | 6/2015 |
| WO | 2014180545 | A1 | 11/2014 |
| WO | 2015062884 | A2 | 5/2015 |

* cited by examiner

ROTOR ASSEMBLY

BACKGROUND

1. Technical Field

The invention relates to a rotor assembly. More particularly, but not exclusively, the invention relates to a rotor assembly for an electric machine, to an electric machine and to a vehicle comprising an electric machine.

2. Related Art

It is increasingly common to use electric machines to develop a tractive force to propel a vehicle, for example a hybrid electric vehicle (HEV) or an electric vehicle (EV). Permanent magnet motors can provide a high power density and efficiency suitable for these applications. However, these characteristics may rely on the use of high energy dense permanent magnets which reduce the required level of electric loading and the associated winding losses for a given power density. The permanent magnets made of rare earth elements, such as Neodymium Iron Boron (NdFeB), provide high power densities and good resistance to demagnetisation. However, these types of permanent magnets are relatively expensive, have historically be subject to price volatility and have been cited as having a significant environmental footprint. Consequently, the use of magnets comprising less or no rare earth elements, such as ferrite magnets, would be desirable at least in certain applications, provided that new motors with sufficient levels of power density, efficiency and resistance to demagnetisation are developed.

Spoke type rotors comprising two parts, namely a plurality of ferromagnetic poles arranged about a central non-magnetic support, offer a rotor topology suitable for developing the required new motors. (The structural integrity of the rotor required for high speed operation is ensured, while providing relatively high levels of power density due to the non-magnetic central support.) However, such two-part rotors typically incur additional costs due to the extra rotor components and the provisions necessary for coupling the poles and the central support to one another. The component parts are typically made using high precision machining process to ensure a sufficient connection therebetween. This machining is relatively expensive and undesirably minimises the performance per cost competitiveness of two-part rotors. It is possible to make the component parts using a relatively inexpensive extrusion process. However, materials which are suitable for use in the extrusion process and which provide good rotor characteristics, e.g. copper beryllium alloy, are undesirably expensive. It is against this backdrop that the invention has been conceived.

SUMMARY

It is an object of embodiments of the invention to at least mitigate one or more of the problems associated with known arrangements.

According to a first aspect of the invention, there is provided a rotor assembly for an electric machine, the rotor assembly comprising: a rotor support hub having a plurality of first connection parts arranged about a periphery the rotor support hub; a plurality of rotor segments each having a second connection part, each of the second connection parts being cooperable with at least one of the plurality of first connection parts to connect each of the rotor segments about the periphery the rotor support hub; and a plurality of fixing parts each configured to be received between cooperating first and second connection parts and to form an inference fit therebetween so as to secure the rotor segments to the rotor support hub. Use of the fixing parts to secure the rotor segments to the rotor support hub negates a requirement for the rotor support hub and/or the rotor segments to be made using a high precision machining process.

In certain embodiments, at least one of the first connection parts or one of the second connection parts may include an indentation configured to receive at least one of the plurality of fixing parts therein. The indentations may facilitate the insertion of the fixing parts at an optimum location relative to first connections parts, the second connection part, or both.

Optionally, at least one of the fixing parts may be a pin. Additionally or alternatively, at least one of the fixing parts may be non-magnetic and/or one of the fixing parts consists of or includes a polymeric material. Additionally or alternatively, at least one of the fixing parts may consist of or include a fibre reinforced material.

In certain embodiments, at least one of the plurality of first connection parts or one of the plurality of second connection parts has a fir tree profile.

In certain embodiments, the rotor support hub may comprise a plurality of laminations. Optionally, one or more of the plurality of laminations may be bonded to at least one other of the plurality of laminations. Additionally or alternatively, one or more of the plurality of laminations may be mechanically fastened, e.g. clamped, to at least one other of the plurality of laminations.

The laminations may be substantially perpendicular to an axis about which in use the rotor support hub rotates. Additionally or alternatively, the laminations are single piece laminations. In certain embodiments, the rotor support hub may consist of or include a non-magnetic material. Additionally or alternatively the rotor support hub may consist of or include a metallic material. In certain embodiments, the laminations may be made of a sheet material. The laminations may be made using a punch or a die or by laser cutting.

In certain embodiments, the rotor assembly may further comprise a plurality of permanent magnets.

According to a second aspect of the invention, there is provided a rotor support hub for supporting a plurality of rotor segments, the rotor support hub comprising a plurality of laminations. In embodiments of the invention according to the second aspect, the rotor support hub may any of the features described above with reference to the rotor support hub of the first aspect.

According to a third aspect of the invention, there is provided a rotor assembly for an electric machine, the rotor assembly comprising a rotor support hub as described above. The rotor assembly may further comprise a plurality rotor segments arranged about a periphery of the rotor support hub.

According to a fourth aspect of the invention, there is provided an electric machine comprising a rotor assembly as described above.

According to a fourth aspect of the invention, there is provided a vehicle comprising an electric machine as described above. The vehicle may be an automobile, an aircraft or a marine vessel.

BRIEF DESCRIPTION OF THE DRAWINGS

Embodiments of the invention will now be described by way of example only, with reference to the accompanying figures, in which.

DETAILED DESCRIPTION

Figure 1:
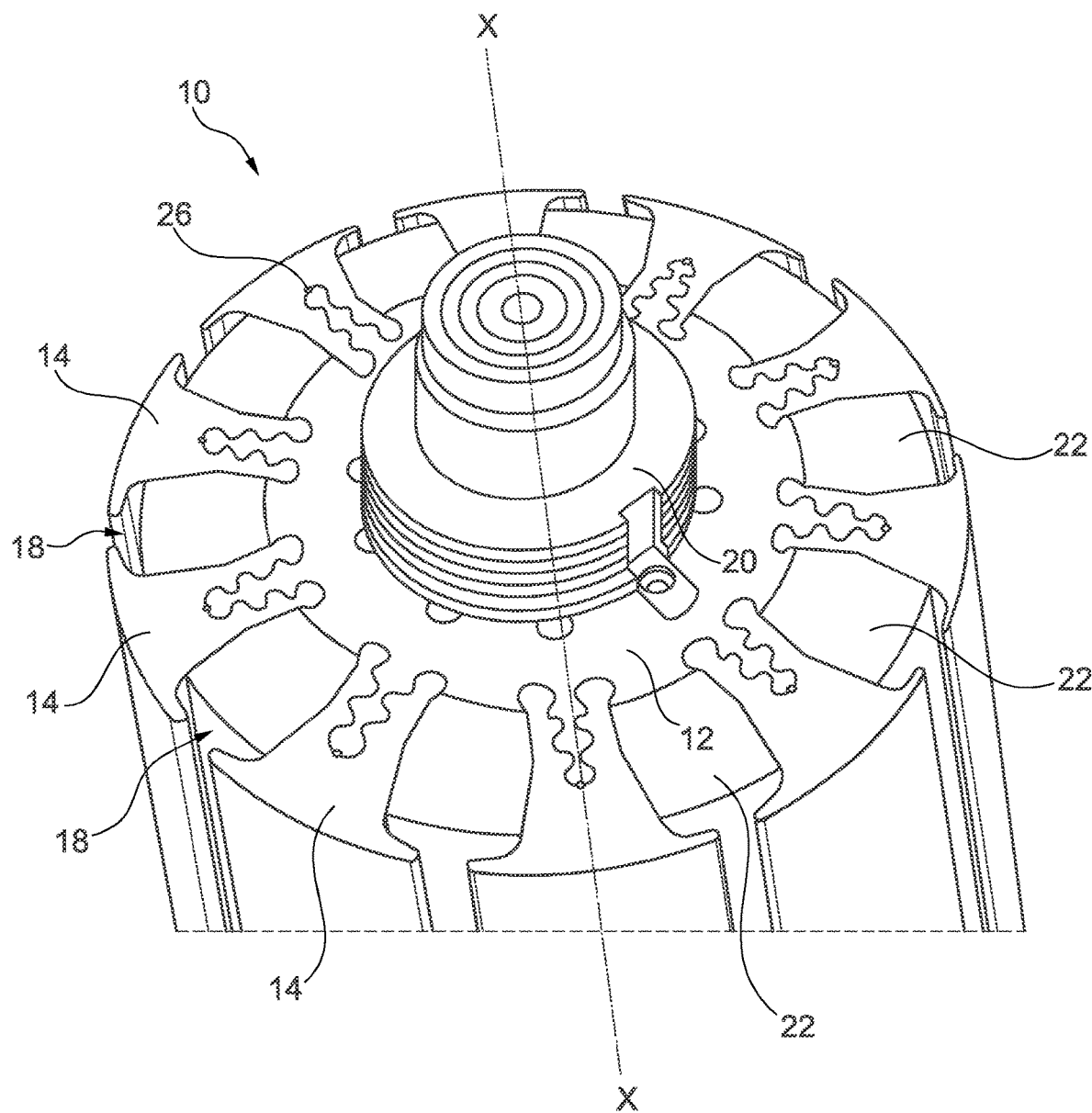
FIG. 1 shows a perspective view of a rotor assembly according to an embodiment of a the invention.

A rotor assembly 10 according to an embodiment of the invention will now be described with reference to the accompanying figures. The rotor assembly 10 has particular application in a traction motor for use in a vehicle 100 (illustrated in FIG. 5). FIG. 1 shows a two-part rotor assembly 10 comprising a rotor support hub 12 and a plurality of rotor segments 14 (sometimes referred to as rotor poles or rotor pole segments). The rotor assembly 10 has a longitudinal axis X-X about which in use it rotates. References herein to radial directions are relative to the longitudinal axis X-X.

Figure 2:
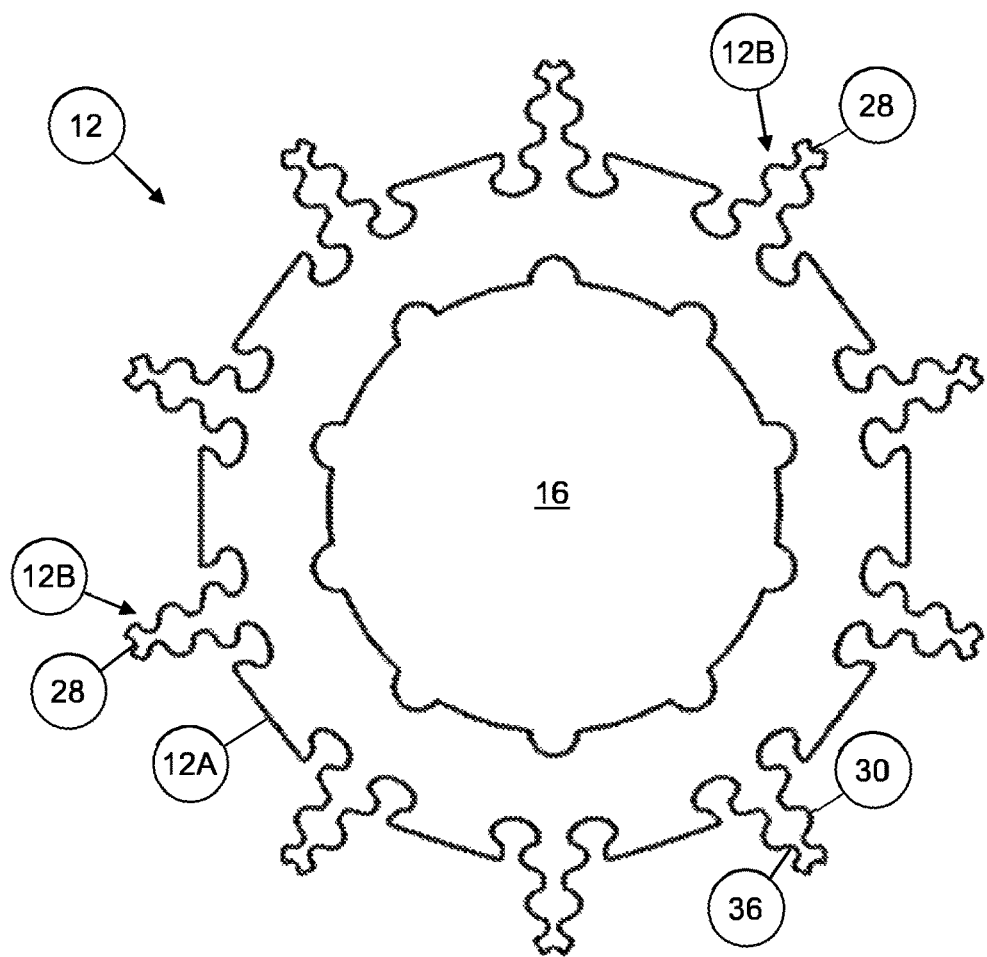
FIG. 2 shows a plan view of a rotor support hub of the rotor assembly of FIG. 1.

The rotor support hub 12 provides a central section of the rotor assembly 10 and has a generally annular profile. A central aperture 16 extends in line with the longitudinal axis X-X through the centre of the support hub 12. The rotor segments 14 are circumferentially spaced about a radially outer periphery 12A (best illustrated in FIG. 2) of the rotor support hub 12. Arranged in this manner, the rotor segments 14 form spokes which extend radially outwardly from the support hub 12. The circumferential spacing between adjacent rotor segments 14 provides a plurality of rotor slots 18. The rotor assembly 10 shown in FIG. 1 has an outer diameter of 140 mm and a stack length of 39 mm, where the stack length is the dimension of the support hub 12 in the direction of longitudinal axis X-X. Of course, other sizes are contemplated, as the exact diameter and/or stack length of the rotor support hub 12 will depend on the specification of the rotor assembly 10, i.e. the exact diameter and/or stack length of the rotor support hub 12 will depend on its design speed, output power and/or critical rotational speed. In certain embodiments, the diameter of the rotor hub 12 may be any suitable diameter between 70 mm and 280 mm. In certain embodiments, the stack length may be any suitable length between 20 mm and 400 mm. In certain embodiments, two or more rotor support hubs 12 may be stacked together in series.

In the present embodiment, the rotor assembly 10 further comprises an output shaft 20 and a plurality of permanent magnets 22. Each of the permanent magnets 22 is mounted in one of the plurality of rotor slots 18. In the present embodiment, there is provided ten rotor segments 14, and thus there are ten rotor slots 18 and ten permanent magnets 22. Of course, it will be understood that certain embodiments will have other than ten rotor segments 14, ten rotor slots 18 and ten permanent magnets 22. The permanent magnets 22 may be ferrite magnets, for example FB9B grade ferrite magnets. However, the permanent magnets 22 may comprise other materials, e.g. rare earth magnets such as NdFeB, SmCo or AlNiCo magnets. Certain embodiments will not comprise permanent magnets 22, e.g. in electric machines relying on reluctance torque or rotors having rotor windings.

Figure 4:
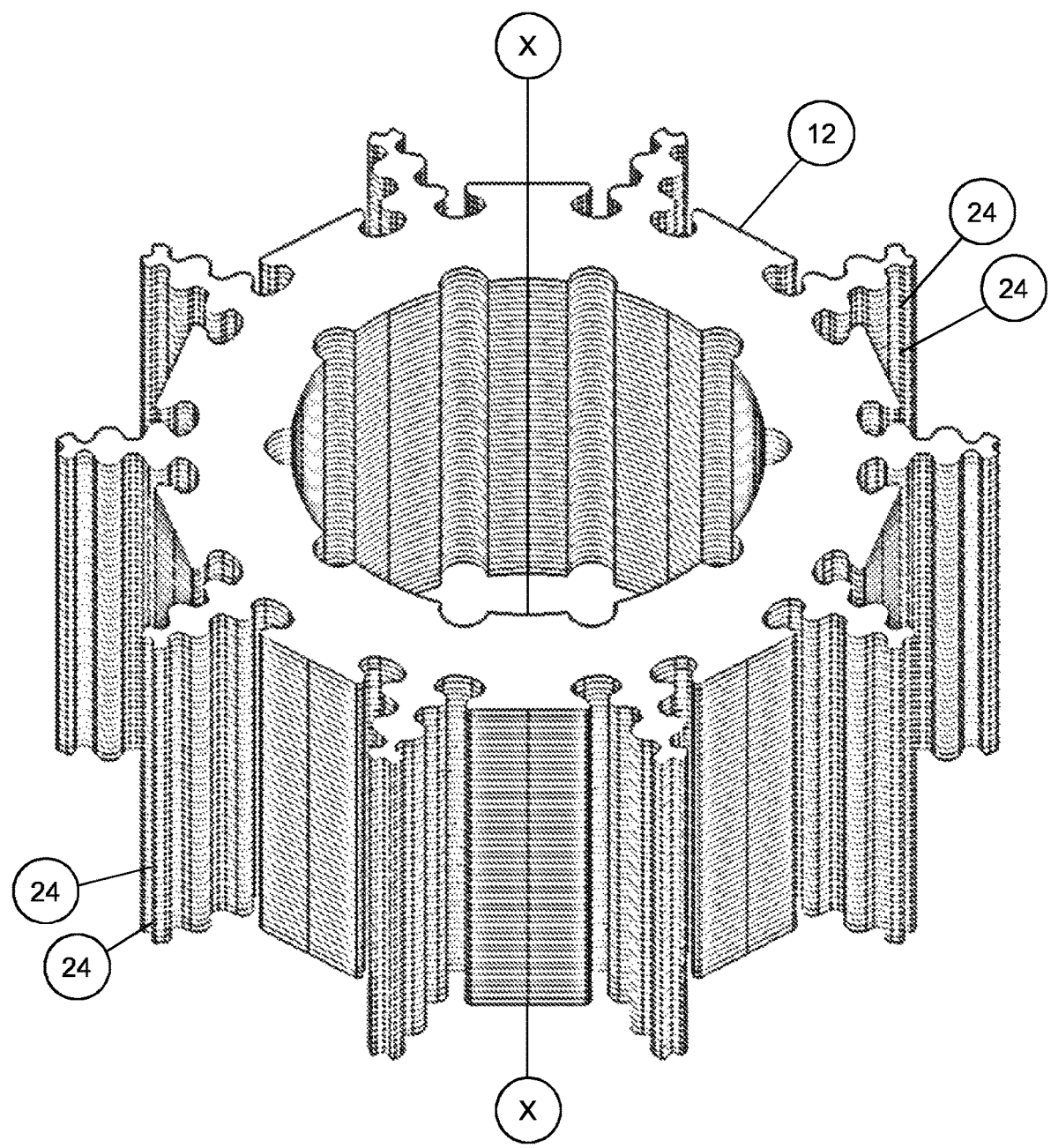
FIG. 4 shows a perspective view of a rotor support hub according to an embodiment of the invention.

The support hub 12 is formed of a non-magnetic material. In the present embodiment, the support hub 12 is formed of non-magnetic steel. Referring to FIG. 4, the support hub 12 may comprise a plurality of single piece first laminations 24 arranged in a stack to form the support hub 12. It will be understood that the first laminations 24 are arranged substantially perpendicular to the longitudinal axis X-X. The first laminations 24 each have a unitary structure and may be formed from a sheet material, e.g. using a punch or a die or by laser cutting. In certain embodiments, the first laminations 24 may be made of 3% work hardened 316 stainless steel. In certain embodiments, the first laminations 24 may be made of [one of AK Steel (R) nitronic grades, e.g. AK Steel (R) nitronic steel 50]. As will be understood, other materials are contemplated, e.g. non-magnetic steels and aluminium, such as 302 and 304 stainless steels and 2024-T3 aluminium alloy. Each of the first laminations 24 may be bonded to at least one other of the first laminations 24. Additionally or alternatively, each of the first laminations 24 may be mechanically fastened, e.g. clamped, to at least one other of the first laminations 24.

The rotor segments 14 are formed from a magnetic material. In certain embodiments, each of the plurality of rotor segments 14 may comprise a plurality of single piece second laminations (not shown) arranged in a stack to form each of the rotor segments 14. In certain embodiments, the rotor segments 14 may be made of M270-35A non-grain oriented electrical steel. Of course, it will be understood that other materials could be used, e.g. any non-grain orientated grade of electrical steel. The rotor segments 14 may be made of an alloyed material to increase their electromagnetic performance, such as high magnetic permeability and low hysteresis and eddy current loss and/or be insulated to minimise eddy current propagation.

Figure 3:
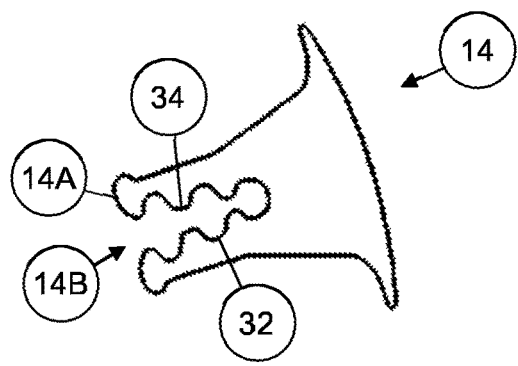
FIG. 3 shows a plan view of a rotor segment of the rotor assembly of FIG. 1.

The radially outer periphery 12A of the rotor support hub 12 may be configured for attachment of the plurality of rotor segments 14 to the rotor support hub 12. In the present embodiment, the profile of the radially outward periphery 12A is formed to provide a plurality of first connection parts 12B (best illustrated in FIG. 2). Moreover, each of the rotor segments 14 has a radially inner portion 14A which may additionally or alternatively be configured for attachment of the plurality of rotor segments 14 to the rotor support hub 12. In the present embodiment, the profile of the radially inner portion 14A is formed to provide a plurality of second connection parts 14B (best illustrated in FIG. 3). The first connection parts 12B may be complementary to the second connection parts 12A. The first and second connection parts 12B, 14B may form a plurality of male connection parts and a plurality of female connection parts, respectively, or vice versa. The first connections parts 12B may form a first connection surface about the radially outer periphery 12A of the rotor support hub 12. Similarly, the second connections parts 12B may form a second connection surface about the radially inner portion 14A of each of the rotor segments 14.

As illustrated in the accompanying figures, each of the plurality of first connection parts 12B may comprise one or more first protrusions 30 and each of the second connection parts 14B may comprise one or more first depressions 32. The first depressions 32 may be configured to be complementary to the first protrusions 30. Additionally or alternatively, each of the second connection parts 14B may comprise one or more second protrusions 34 and each of the first connection parts 14B may comprise one or more second depressions 36. The second depressions 36 may be configured to be complementary to the second protrusions 34. The protrusions 30, 34 may extend perpendicularly from the radial direction or at a tangent to the radial direction. As will be understood, the first protrusions 30 and/or the second depressions 36 may form part of the radially outer periphery 12A of the rotor support hub 12. Thus, the first protrusions 30 and/or the second depressions 36 may form part of the first connection surface. The second protrusions 34 and/or the first depressions 32 may form part of the radially inner portion 14A of each of the rotor segments 14. Thus, the second protrusions 34 and/or the first depressions 32 may form part of the second connection surface. The above described first and second connection parts 12B, 14B are sometimes referred to as a "fir tree" structure.

The first and second connection parts 12B, 14B are configured to cooperate (e.g. interlock) with one another so as to connect the plurality of rotor segments 14 about the radially outer periphery 12A of the rotor support hub 12. The first connection parts 12B may be at least partially received within the cooperating second connection parts 14B, or vice versa. Cooperation of the first and second connection parts 12B, 14B may be facilitated by one or more first protrusions 30 being at least partially received by one or more respective first depressions 32. Similarly, cooperation of the first and second connection parts 12B, 14B may be facilitated by one or more second protrusions 34 being at least partially received by one or more respective second depressions 36. This at least partial receipt of the one or more of the protrusions 30, 34 in the respective depressions 32, 36 results in abutment of the first connection parts 12B and the cooperating second connection parts 14B when the parts 12B, 14B are moved relative to one another in any direction in a plane perpendicular to the longitudinal axis X-X. Thus, the first connection parts 12B are retained in the second connection parts 14B, or vice versa. Cooperation of the first and second connection parts 12B, 14B limits movement of the rotor segments 14 relative to the rotor support hub 12 in the plane perpendicular to the longitudinal axis X-X. Cooperation of the first and second connection parts 12B, 14B loosely connects the rotor support hub 12 and the rotor segments 14, i.e. provides an approximate fit and/or play between the rotor support hub 12 and each of the rotor segments 14 in the plane perpendicular to the longitudinal axis X-X. Cooperation of the first and second connection parts 12B, 14B results in abutment of the first and second connection surfaces when the parts 12B, 14B are moved relative to one another in any direction in a plane perpendicular to the longitudinal axis X-X.

The first and second connection parts 12B, 14B may be configured to cooperate with one another so as to provide a clearance/sliding fit with one another. In other words, the first and second connection parts 12B, 14B may be configured to cooperate with one another so as to permit movement of each of the rotor segments 14 relative to the rotor support hub 12 in a direction parallel to the longitudinal axis X-X. Indeed, this how each of the rotor elements 14 may be easily assembled on to the rotor support hub 12. Thus, one of a plurality of gaps is provided between the rotor support hub 12 and each of the plurality of rotor segments 14. Crucially, in accordance with embodiments of the invention, there is no requirement for the rotor support hub 12 and rotor segments to fit tightly together by virtue of the interlocking connection parts 12B, 14B alone. Thus, there is no requirement for the rotor support hub 12 and/or the rotor segments 14 to be made using a high precision machining process.

The rotor assembly 10 further comprises a plurality of fixing parts 26. In the present embodiment, the fixing parts 26 are metallic roll pins (sometimes referred to as spring pins or tension pins). However, the fixing parts 26 are not limited to roll pins and/or need not be metallic. In certain embodiments, one or more of the fixing parts 26 may be a pin, a rod, a bar, a cylinder or prism. Moreover, one or more of the fixing parts 26 may or may not be magnetic. In certain embodiments, one or more of the fixing parts 26 may be made of a polymeric material, e.g. a phenolic resin. The fixing parts 26 may be made of a fibre reinforced material. The fixing parts 26 are configured to be received in each of the gaps between the rotor support hub 12 and each of the plurality of rotor segments 14 and to form an interference fit therebetween. Thus, the fixing parts 26 take up the play between the rotor support hub 12 and each of the rotor segments 14. The fixing parts 26 secure each of the rotor segments 14 to the rotor support hub 12. In order to provide the interference fit, each of the fixing parts may have a width/diameter larger than the gap between the rotor support hub 12 and each of the plurality of rotor segments 14.

To provide the interference fit, the fixing parts 26 are forcibly inserted between the first and second connection parts 12B, 14B. Each of the fixing parts 26 may have a length substantially equal to the stack length of the rotor support hub 12. Each of the fixing parts 26 may have a constant cross section substantially along its length. The forced insertion partially compresses each of the fixing parts 26 and results in a compressive force being exerted by the fixing parts 26 on each of the first and second connection parts 12B, 14B. The force displaces the first and second connection parts 12B, 14B relative to one another in the in the plane perpendicular to the longitudinal axis X-X until abutment of the parts 12B, 14B occurs as described above. The fixing parts 26 may urge the first and second connection parts 12B, 14B against one another so as to provide a tight fit therebetween. Thus, the fixing parts 26 may urge the first and second connection surfaces against one another.

In the illustrated embodiment, each of the first connection parts 12B is provided with one of a plurality of indentations 28, each of which is shaped to at least partially receive at least one of the fixing parts 26. The indentations 28 may exaggerate each of the gaps at a desirable location relative to either of the first and second connection parts 12B, 14B, or both. The indentations 28 may at least partially provide the gaps between the first and second connection parts 12B, 14B. While the fixing parts may be inserted anywhere between the first and second connection parts 12B, 14B, the indentations 28 may facilitate the insertion at an optimum location relative to first connections parts 12B, the second connection part 14B, or both.

Figure 5:
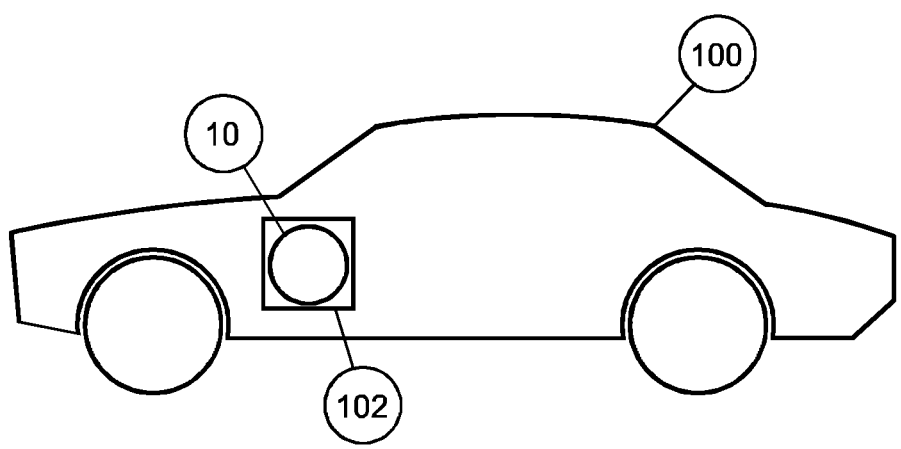
FIG. 5 shows a schematic representation of a vehicle incorporating an electric machine according to an embodiment of the invention.

FIG. 5 shows a schematic representation of a vehicle 100 comprising an electric machine 102. The electric machine 102 comprises the rotor assembly 10. The electric machine 102 generates a tractive force for propelling the vehicle 100. The vehicle may, for example, be a hybrid electric vehicle (HEV), an electric vehicle (EV) or a plug-in hybrid electric vehicle (PHEV). The vehicle 100 may be an automobile, an aircraft or a marine vessel. A problem associated with the use of conventional two-part rotors is the additional cost due to the extra rotor components and the provisions necessary for coupling the poles and the central support to one another. At least in certain embodiments, use of the fixing parts 28 may reduce the need for high precision, high cost machining of the rotor support hub 12 and/or the rotor segments 14. In certain embodiments, the laminations 24 may reduce the need for costly machining of the rotor support hub 12.

The invention is not restricted to the details of any above described embodiments, e.g.

the rotor assembly 10 may include a rotor support hub 12 not comprised of the plurality of first laminations 24. The plurality of rotor segments 14 may or may not comprise the plurality of second laminations. In certain embodiments, neither the first nor second connection parts 12B, 14B comprise one of the plurality of indentations 28. Certain embodiments may comprise the rotor hub 12 without the connections first parts 12B. All of the features disclosed in this specification (including any accompanying claims and drawings) may be combined in any combination, except combinations where at least some of such features are mutually exclusive.

Each feature disclosed in this specification (including any accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features.

The invention extends to any novel one, or any novel combination, of the features disclosed in this specification (including any accompanying claims and drawings). The claims should not be construed to cover merely the foregoing embodiments, but also any embodiments which fall within the scope of the claims.

The invention claimed is:

1. A rotor assembly for an electric machine, the rotor assembly comprising:
   a rotor support hub having a plurality of first connection parts arranged about a periphery of the rotor support hub;
   a plurality of rotor segments each having a second connection part, each of the second connection parts being cooperable with at least one of the plurality of first connection parts to connect each of the rotor segments about the periphery of the rotor support hub; and
   a plurality of fixing parts each configured to be received between cooperating first and second connection parts and to form an inference fit therebetween so as to secure the rotor segments to the rotor support hub,
   wherein the rotor support hub comprises a plurality of laminations and is formed of non-magnetic steel, and wherein each of the plurality of first connection parts has a fir tree profile.

2. A rotor assembly according to claim 1, wherein at least one of the first connection parts or one of the second connection parts includes an indentation configured to receive at least one of the plurality of fixing parts therein.

3. A rotor assembly according to claim 1, wherein at least one of the fixing parts is a pin.

4. A rotor assembly according to claim 1, wherein at least one of the fixing parts is non-magnetic.

5. A rotor assembly according to claim 1, wherein at least one of the fixing parts consists of or includes a polymeric material.

6. A rotor assembly according to claim 1, wherein at least one of the fixing parts consists of or includes a fiber reinforced material.

7. A rotor support assembly according to claim 1, wherein one or more of the plurality of laminations is bonded to at least one other of the plurality of laminations.

8. A rotor support assembly according to claim 1, wherein one or more of the plurality of laminations is mechanically fastened to at least one other of the plurality of laminations.

9. A rotor assembly according to claim 1, wherein the rotor assembly further comprises a plurality of permanent magnets.

10. An electric machine comprising a rotor assembly according to claim 1.

11. A vehicle comprising an electric machine according to claim 10.

12. A rotor support hub for supporting a plurality of rotor segments, the rotor support hub comprising:
    a plurality of laminations; and
    a plurality of first connection parts arranged about a periphery the rotor support hub for connection to the plurality of rotor segments,
    wherein the rotor support hub is formed of non-magnetic steel, and wherein each of the plurality of first connection parts has a fir tree profile.

13. A rotor support hub according to claim 12, wherein the laminations are substantially perpendicular to an axis about which in use the rotor support hub rotates.

14. A rotor support hub according to claim 12, wherein the laminations are single piece laminations.

15. A rotor support hub according to claim 12, wherein the rotor support hub consists of or includes a metallic material.

16. A rotor support hub according to claim 12, wherein the laminations are made of a sheet material.

17. A rotor support hub according to claim 12, wherein the laminations are made using a punch or a die or by laser cutting.

18. A rotor assembly for an electric machine, the rotor assembly comprising the rotor support hub of claim 12.

19. A rotor assembly according to claim 18, further comprising a plurality rotor segments arranged about a periphery of the rotor support hub.

20. An electric machine comprising a rotor support hub according to claim 12.

* * * * *

UNITED STATES PATENT AND TRADEMARK OFFICE
CERTIFICATE OF CORRECTION

| | |
|---|---|
| PATENT NO. | : 11,336,137 B2 |
| APPLICATION NO. | : 16/069726 |
| DATED | : May 17, 2022 |
| INVENTOR(S) | : James Dumesnil Widmer and Mohammad Kimiabeigi |

It is certified that error appears in the above-identified patent and that said Letters Patent is hereby corrected as shown below:

In the Claims

Column 7, Claim 1, Line 37, "inference" should read -interference-

Signed and Sealed this
Eleventh Day of July, 2023

Katherine Kelly Vidal
*Director of the United States Patent and Trademark Office*